H. K. ANGSTRÖM.
DEVICE FOR TRANSMITTING ELECTRIC CURRENT BETWEEN ROTATING AND NONROTATING MEMBERS.
APPLICATION FILED MAR. 12, 1921.

1,433,331.

Patented Oct. 24, 1922.

Inventor
H. K. Ångström

Patented Oct. 24, 1922.

1,433,331

UNITED STATES PATENT OFFICE.

HILDING KNUTSSON ÅNGSTRÖM, OF MALMO, SWEDEN.

DEVICE FOR TRANSMITTING ELECTRIC CURRENT BETWEEN ROTATING AND NON-ROTATING MEMBERS.

Application filed March 12, 1921. Serial No. 451,812.

*To all whom it may concern:*

Be it known that I, HILDING KNUTSSON ÅNGSTRÖM, of Malmo, Sweden, civil engineer, have invented a new and useful Improvement in Devices for Transmitting Electric Current Between Rotating and Nonrotating Members, (for which I have filed applications in Sweden, June 25, 1919, and Jan. 26, 1921), of which the following is a specification.

My invention relates to a device for transmitting electric current between rotating and non-rotating members such as journals and journal-boxes for street cars, electric locomotives or the like, wherein the current flows between the earth and one or more feeders through the wheels and shafts carrying the movable body.

If no special device is used for such transmitting of current the same will pass directly through the bearing surfaces and on account of the lubricant at hand between said surfaces these will be corroded owing to electrolysis. This destroying effect will particularly be noticeable when using roller or ball bearings between the journal and the box as such bearings are very liable to damages if the surfaces are not entirely perfect.

The principal object of my invention is to provide means whereby the current may be shunted off from the bearing surfaces and brought to pass mainly through other devices of a less sensitive construction. Generally said devices consist in a disc carried by and electrically connected with the rotating member, which disc is located within a chamber or the like arranged within the non-rotating member and suitably but partly filled with a good liquid or pulverous electric conductor such as mercury or graphite powder, the rotating disc being in constant contact with the said electric conductor, which because of its location also is in constant ontact with the non-rotating member.

Figure 1:
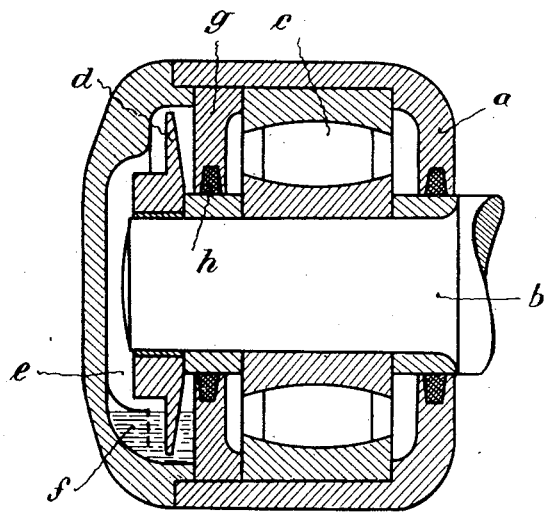
Figure 2:
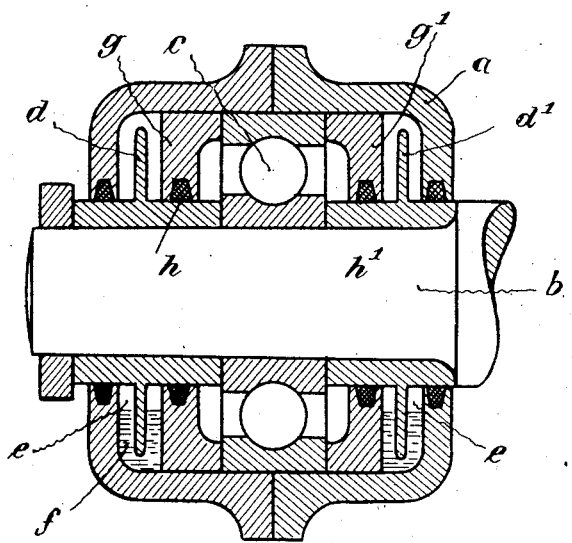

The invention will be more particularly described by reference to the accompanying drawings, wherein Figs. 1 and 2 diagrammatically show the principle of the invention and represent two different modifications thereof in vertical section through the bearings. In the same manner Figs. 3-6 show four other modifications of the invention. Similar reference letters refer to the same particulars throughout.

In Figs. 1 and 2, $a$, represents the journal box and $b$ the shaft journaled therein by means of suitable bearings $c$. In Fig. 1 a roller bearing is shown and for the same purpose a ball bearing is used according to Fig. 2, but it may be noted that the kind of bearings used has no influence upon the invention.

According to Fig. 1 the shaft ends within the journal box and the journal is provided with a disc $d$ being in good electric contact with the journal. The said disc is placed within a separate chamber $e$ arranged within the box and the lower edge of the disc is submerged into a filling $f$ consisting of mercury or graphite powder. In any case, especially when mercury is used, the interior of the chamber $e$ may be separated from the interior of the bearing proper by means of a wall $g$ and packing rings $h$ so that the electric conductor cannot come into contact with the bearing surfaces. From Fig. 1 it will be seen that the disc may be axially displaced so that it comes to rest against the adjacent surface of the box cover and if the disc is made elastic, i. e. by providing the same with radial slots, it may be used for taking up axial forces acting upon the shaft, so that they do not act upon the bearing proper and are to be taken up thereby. In such cases it is advisable to use graphite powder for transmission of the electric current while graphite is to be considered a good lubricant between the contact surfaces, a little space being normally provided between the disc and the contact surface of the box cover so that the disc may come in action for taking up the thrusts in cases of need only.

According to Fig. 2 the journal passes through the box and two rotating discs $d$, $d^1$, arranged at opposite sides of the bearing proper, are provided, but otherwise the construction entirely corresponds to the one described above. It is evident that one or both of the discs may be used for taking up the thrusts as described with reference to Fig. 1 and in the same manner two discs according to Fig. 2 may be used in combination with the modification shown in Fig. 1.

For making use of the devices described above one or more chambers for taking up the electric conductor must be provided within the journal box and this means a limitation because then the journal box from the beginning must be constructed so as to answer the purpose desired. It is desirable to do away with this limitation and the modifications described below are intended to serve this purpose. In these modifications the journal box may be of any construction, as it is only needed to provide a central hole in the cover thereof. The current transmitting device, although based upon the principle referred to above, may be affixed or removed without the slightest change of the bearing proper or the box surrounding the same. Thus the invention also may be used in combination with such existing journal boxes, which from the beginning have not been intended for the purpose.

In all of the modifications shown in Figs. 3-6 the rotating member or journal has the reference 1, and 2 is the non-rotating member or journal box. The journal is carried by said box by means of any suitable bearing 3 shown in Figs. 3 and 4 but omitted in Figs. 5 and 6 as not necessary for the purpose of description.

Figure 3:
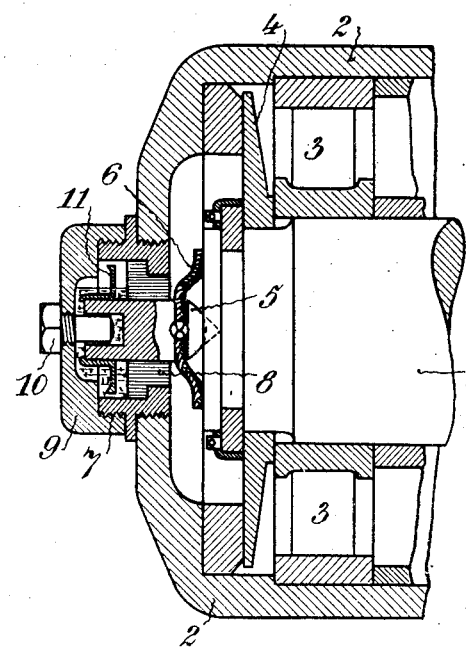

According to Fig. 3 the transmission of current is mainly to be effected by means of the flexible disc 4, said disc also serving the purpose of taking up the thrust of the shaft as described above. At the end of the journal is arranged a pin 5 connected with the journal by means of flexible copper wires 6 riveted or soldered to the pin and the journal respectively. Thus, this pin remains fixed to the journal if the other parts of the device are removed. The current transmission device consists of the following parts viz, one inner sleeve or boss 7 screwed into a hole in the box cover and internally provided with a bearing 8 for the pin 5 and a cap 9 screwed upon the end of the boss 7 and provided with a screw or the like 10 serving as well for introducing of mercury or graphite as for the guiding of the outer end of the pin 5, in which it projects into a central bore. Upon the outer end of the pin 5 is pressed or otherwise affixed a contact disc 11, which is to be placed upon the pin before closing the device by means of the cap 9, the peripheral edge of said disc extending within the chamber formed in the boss 7 between the bearing 8 and the bottom of the cap 9. This chamber is to be more or less filled with mercury or graphite powder and thereafter this modification acts in the same manner as described above.

Figure 4:
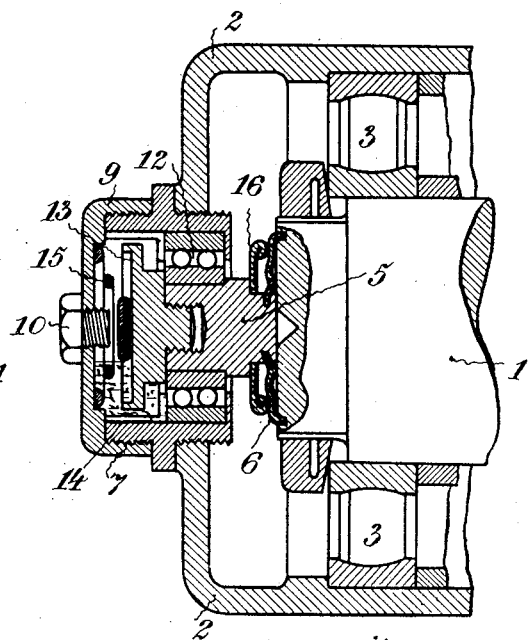

The modification according to Fig. 4 is essentially alike the one just described and similar particulars are referred to by the same reference letters. Herein the pin 5, however, is carried by a ball bearing 12, instead of the bearing 8 described above, and the whole construction is somewhat stronger than the one shown in Fig. 3, the disc 4 being left out. The contact pin 5 is divided in two parts screwed together, of which parts the outer one 13, placed within the boss 7, is provided with a flange substituting the disc according to Fig. 3. The screw 10 is shorter and does not form any guide for the pin 5. The ball bearing 12 is provided with a cylindrical outer ballrace so as to permit a longitudinal movement of the contact pin, and outwardly the bearing rests against a supporting ring 14. A spring 15 is provided and serves as an auxiliary contact member and has for its purpose to press the pin 5 against the shaft 1. The disc or flange 13 is intended to be the main contact member and rotates submerged within a liquid or pulverous electric conductor as described above. The connection between the pin 5 and the journal 1 is carried out by means of copper wires 6 and a protecting plate 16 is arranged outside of these wires.

Figure 5:
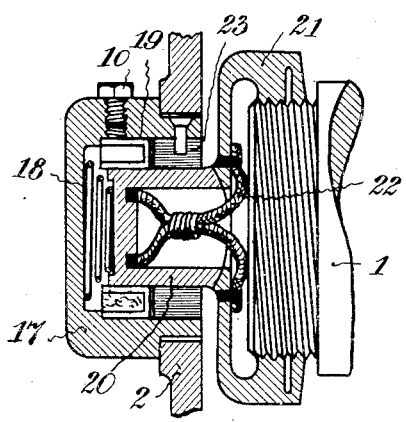

Fig. 5 shows a somewhat simpler construction and the cap 17 enclosing the device is carried out in one piece only. Instead of the current being transmitted by means of a disc or flange rotating together with the contact pin the transmission of current in this case is effected by means of a spring 18 and an elastic contact boss 19 fixed to the cap 17 serving mainly as a packing while the chamber formed between said boss and the bottom of the cap in this case is totally filled with mercury or graphite powder so that the mass of said material is constantly in contact with the contact pin 20 as the walls of the cap 17. The contact pin 20 in this case is not directly connected with the journal but with a capsular nut 21 surrounding the end of the same. In order to allow a small movement of the pin and the journal in relation to each other the adjacent surfaces of the pin 20 and the nut 21 are spherical. In order to secure the electrical connection copper wires 22 are provided and said wires on account of their flexibility do not prevent the movement referred to above, which movement unavoidably must be provided for while the journal because of vibrations always will have a small movement in relation to the box and parts affixed thereto. The pin 20 is journaled in a common bearing 23 and the screw 10 is arranged upon the upper side of the cap 17 so as to permit a complete filling of the same.

Figure 6:
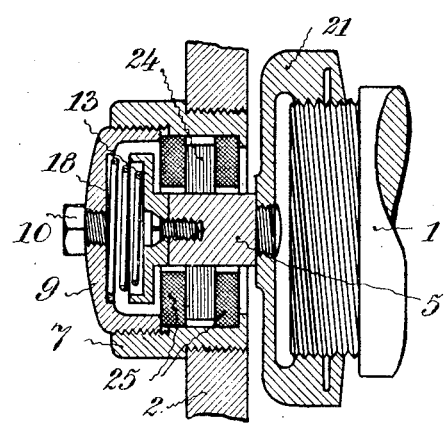

The modification shown in Fig. 6 is further simplified and the contact pin is divided into two parts 5 and 13 according to Fig. 4 and screwed into a nut 21 in conformity to Fig. 5. The casing is carried out in the form of a sleeve or boss 7 and a cap 9 closing the same in accordance with Figs. 3 and 4 and the screw 10 is centrally arranged in the cap 9. The transmission of current is effected by the member 13, which rotates within a filling of mercury or graphite powder and the pin is journalled in the sleeve 7 by means of a felt packing ring 24 compressed between two metal rings 25, this arrangement because of the flexibility of the packing ring 24 permitting a small movement of the pin and the journal box in relation to each other which is necessary while the pin in this case is rigidly connected with the journal. Because of this rigid connection it is evident that the bearing for the pin 5 needs to serve its purpose in a small degree only and its main function is to form a packing between the interior of the journal box and the chamber containing the fluid or pulverous electric conductor. As shown in the drawing the pin in a longitudinal direction is acted upon by a contact spring 18 in the same manner as shown in Fig. 5, said spring resting against the bottom of the cap 9. The connection between the two parts of the pin is carried out by means of a screw substantially as described with reference to Fig. 4.

In all of the modifications shown and described vibrations between the journals and the journal boxes are taken into consideration, such vibrations being unavoidable, and in spite thereof the current transmitting property of the device is not diminished in any way.

The device may easily be standardized in one form or the other and may be combined with as well common bearings as roller or ball bearings independently of the construction of the journal box. If any of the parts of the current transmitting device on account of too heavy stresses is broken down no parts or splinters thereof will be able to intrude in the bearing proper and damage the same.

Having now described my invention and the manner, in which the same is to be performed, I declare that what I claim is:—

1. A device for transmitting electric current between a journal and a journal box surrounding the same, consisting of a closed casing disconnectably affixed to the end wall of the box and forming a chamber for taking up a liquid or pulverous electric conductor, such as mercury or graphite powder, a pin electrically connected with the journal and extending into said casing, means for forcing the pin to rotate together with the journal, and means for separating the casing from the box bearing proper.

2. A device of the character described, comprising in combination a journal and a journal box surrounding the same, a closed casing disconnectably affixed to the end wall of the box, a pin electrically connected and rotating with the journal, the end of said pin extending into the casing, a flange shaped member affixed to the pin and surrounded by said casing, a liquid or pulverous electric conductor, such as mercury or graphite powder, being introduced into said casing so that said flange shaped member rotates in constant contact therewith.

3. A device of the character described and intended for use in connection with journal boxes, consisting of a closed casing disconnectably affixed to the centre part of the box at its one end, said casing being formed by a boss screwed into a hole in the box and a cap secured by threads at the free end of the boss, a bearing arranged within said boss and surrounding a pin, which is electrically connected with the end of the journal and rotates therewith, a disc arranged at the end of the pin within the closed casing, which contains a pulverous electric conductor, such as graphite powder, in such a manner that the same is in constant contact with the disc.

HILDING KNUTSSON ÅNGSTRÖM.